US008006196B2

(12) United States Patent
Hall

(10) Patent No.: US 8,006,196 B2
(45) Date of Patent: Aug. 23, 2011

(54) MULTI-APPLICATION GRAPHIC DISPLAY ENVIRONMENT

(75) Inventor: Christopher J. Hall, Boston, MA (US)

(73) Assignee: Presagis, Quebec (CA)

( * ) Notice: Subject to any disclaimer, the term of this patent is extended or adjusted under 35 U.S.C. 154(b) by 653 days.

(21) Appl. No.: 10/938,281

(22) Filed: Sep. 10, 2004

(65) Prior Publication Data

US 2006/0055702 A1    Mar. 16, 2006

(51) Int. Cl.
*G06F 3/048* (2006.01)
(52) U.S. Cl. ........................ 715/778; 715/781
(58) Field of Classification Search .......... 715/790–794, 715/797, 798, 778, 781, 786, 848, 850, 861
See application file for complete search history.

(56) References Cited

U.S. PATENT DOCUMENTS

| | | | | |
|---|---|---|---|---|
| 4,559,533 A * | 12/1985 | Bass et al. | ...................... | 715/790 |
| 4,769,636 A * | 9/1988 | Iwami et al. | ...................... | 715/790 |
| 4,819,189 A * | 4/1989 | Kikuchi et al. | ............... | 715/797 |
| 5,043,923 A * | 8/1991 | Joy et al. | ........................ | 715/781 |
| 5,101,365 A * | 3/1992 | Westberg et al. | ............. | 715/807 |
| 5,140,677 A * | 8/1992 | Fleming et al. | ............... | 715/835 |
| 5,305,435 A * | 4/1994 | Bronson | ...................... | 715/777 |
| 5,511,196 A * | 4/1996 | Shackelford et al. | ......... | 719/315 |
| 5,515,494 A * | 5/1996 | Lentz | ............................. | 715/797 |
| 5,600,346 A * | 2/1997 | Kamata et al. | ................ | 715/807 |
| 5,781,192 A * | 7/1998 | Kodimer | ........................ | 715/770 |
| 5,896,141 A * | 4/1999 | Blaho et al. | ................... | 345/541 |
| 6,018,774 A * | 1/2000 | Mayle et al. | .................. | 709/250 |
| 6,803,923 B1 * | 10/2004 | Hamburg | ....................... | 345/629 |
| 7,610,352 B2 * | 10/2009 | AlHusseini et al. | .......... | 715/751 |
| 2003/0142138 A1 | 7/2003 | Brown et al. | | |
| 2006/0020902 A1 * | 1/2006 | Tabi | .............................. | 715/790 |

FOREIGN PATENT DOCUMENTS

| | | |
|---|---|---|
| WO | WO 94/27240 A | 12/1994 |
| WO | WO 95/12194 A | 5/1995 |
| WO | WO 97/11431 A | 3/1997 |
| WO | WO 00/63768 A | 10/2000 |

OTHER PUBLICATIONS

Notification Concerning Transmittal of International Preliminary Report on Patentability, (Chapter 1 of the Patent Cooperation Treaty), Nov. 1, 2007, PCT/US2005/032530.
Notification of Transmittal of the International Search Report and the Written Opinion of the International Searching Authority, or the Declaration, Oct. 10, 2007, PCT/US2005/032530.
Official Action, EP 05796871.1, May 7, 2009.

* cited by examiner

*Primary Examiner* — Weilun Lo
*Assistant Examiner* — Truc T Chuong
(74) *Attorney, Agent, or Firm* — FSP LLC

(57) ABSTRACT

Graphics information resulting from operation of applications is directed to a set of visible windows. A set of graphics contexts is provided having fixed associations with the applications. A set of variable associations is provided between the graphics contexts and the windows, so that varying the windows to which graphics information resulting from operation of the applications is directed is accomplished by varying the associations between the graphics contexts and the windows.

5 Claims, 10 Drawing Sheets

MULTI-APPLICATION GRAPHIC DISPLAY ENVIRONMENT

TECHNICAL FIELD

The present disclosure relates to window management in a graphical computing environment.

BACKGROUND

It is common in graphical computing environments to partition the graphical display into windows. Windows are commonly rectangular areas comprising graphical data associated with a particular computing application.

General purpose computing environments often provide for large numbers of windows in arbitrary overlapping configurations. It may be complex and time-consuming to properly account for changes (e.g., update) such arbitrary configurations, and to properly safeguard the accuracy of the content of the display. In safety-critical time-constrained applications, it may be especially important that updates to the graphical display are carried out within a time-bounded fashion, and in a manner that protects the visual content of safety-critical windows, and the display overall.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

Graphics information resulting from operation of applications is directed to a set of visible windows. A set of graphics contexts is provided having fixed associations with the applications. A set of variable associations is provided between the graphics contexts and the windows, so that varying the windows to which graphics information resulting from operation of the applications is directed is accomplished by varying the associations between the graphics contexts and the windows.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, "logic" refers to any configuration of circuits and/or signals that may be applied to affect operations within a device. Logic may comprise signals stored in a device memory and applied to a processing device, such as a microprocessor, digital signal processor, microcontroller, and so on. Software is one example of such logic. Examples of device memories that may comprise logic include RAM (random access memory), flash memories, ROMS (read-only memories), EPROMS (erasable programmable read-only memories), mass storage, cache memories, and EEPROMS. Logic may also be comprised by digital and/or analog electrical hardware circuits. Logic may be formed from combinations of software and hardware.

Figure 1:
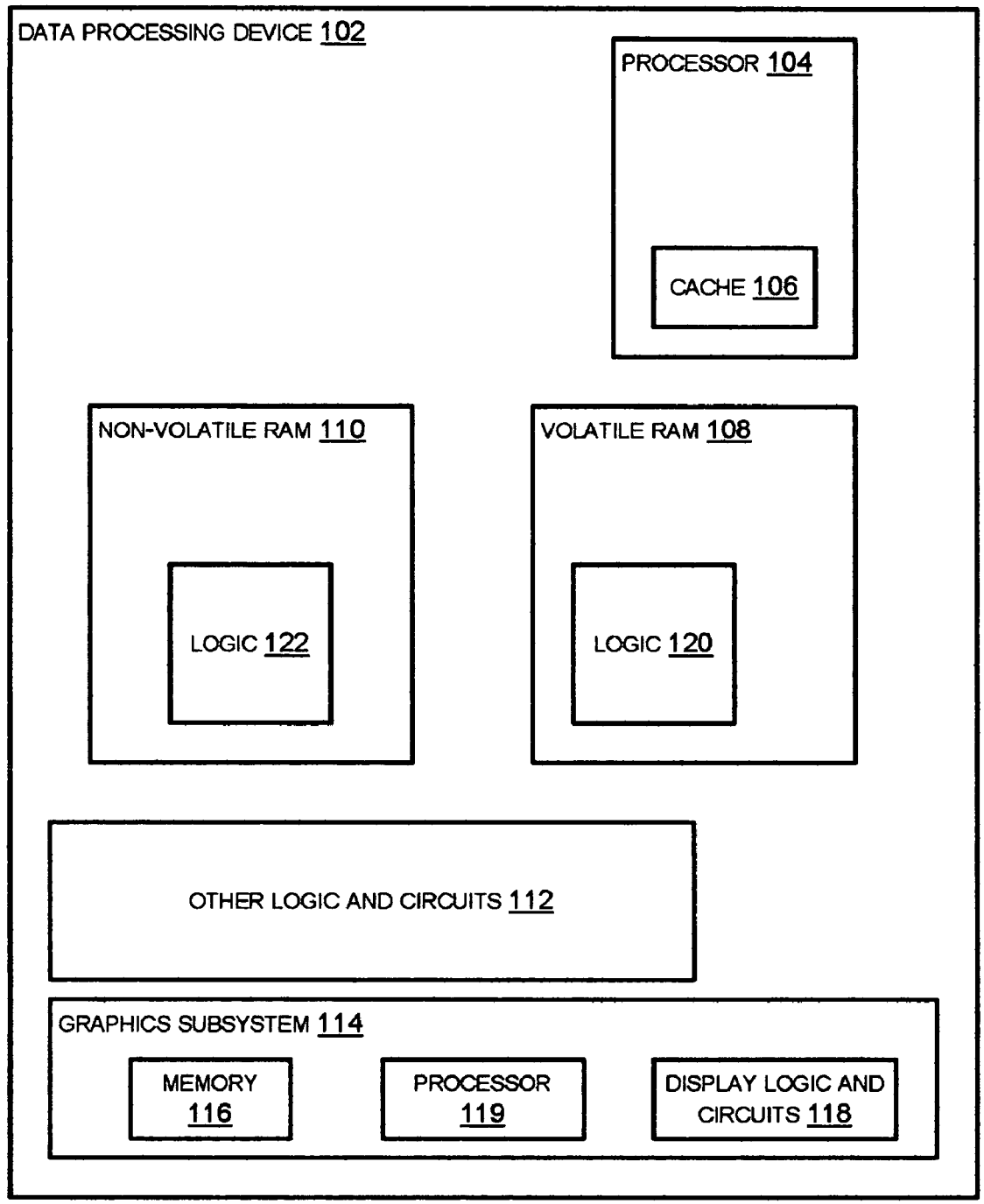
FIG. 1 is a block diagram of an embodiment of a data processing device.

FIG. 1 is a block diagram of an embodiment of a data processing device. A data processing device 102 (such as a vehicular display system) comprises a processor 104 and various types of memory. The types of memory may include a processor cache 106, volatile random access memory (RAM) 108, and non-volatile RAM 110 (read-only memory, magnetic and optical discs or other media, flash memory, and so on).

The data processing device 102 may also comprise other logic and circuits 112 to perform processing that is not central to the present discussion. The data processing device 102 comprises a graphics subsystem 114 that includes memory 116, display logic and circuits 118, and a graphics processor 119, among other things.

The volatile RAM 108 may comprise logic 120 that, when applied to the processor, results in collection, configuration, and display of graphics information. At any particular time, portions/versions 122 of the logic 120 may be comprised by non-volatile RAM 110. Likewise, the cache 106 may at times comprise portions/versions of the logic 120.

Figure 2:
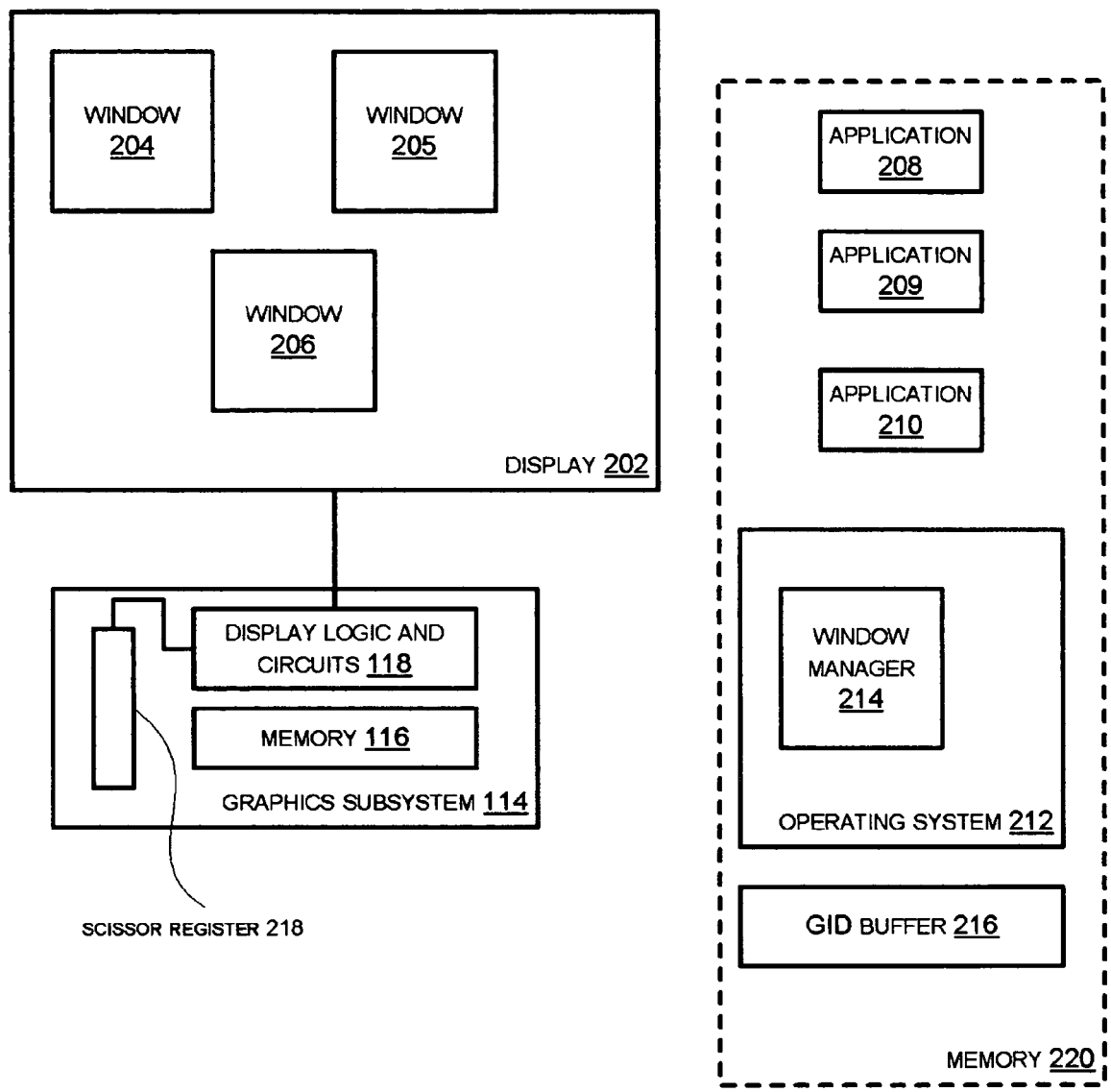
FIG. 2 is a block diagram of an embodiment of a graphical computing environment.

FIG. 2 is a block diagram of an embodiment of a graphical computing environment. A graphics subsystem 114 comprises a memory 116, display logic and circuits 118, and a scissor register 218. The display logic and circuits 118 are coupled to a display 202. The scissor register 218 is coupled to display logic and circuits 118. The display 202 comprises windows 204-206 (the number of windows may be more or less than illustrated).

The environment includes an operating system 212 to manage computing resources. The operating system 212 comprises a window manager 214 to manage the display and control of windows. A memory 220 of the data processing device, which may comprise, among other elements, memories 106, 108, and 110, comprises various logic applications 208-210. Logic applications 208-210 are applied to one or more processors 104 to carry out various graphical computing operations, such as updating the contents of windows 204-205.

The memory 220 further comprises a GID buffer 216. The purpose of the GID buffer 216 is explained in more detail in conjunction with later figures.

Figure 3:
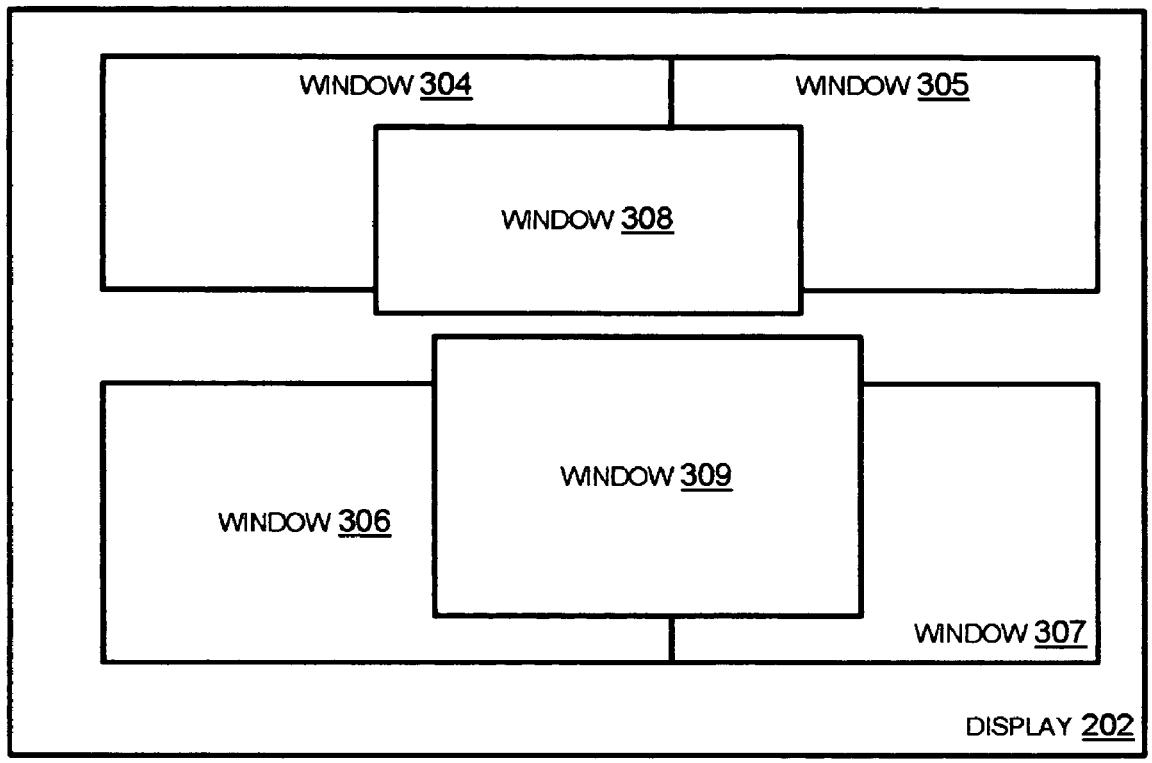
FIG. 3 is a block diagram of an embodiment of windows in a graphical computing environment.

FIG. 3 is a block diagram of an embodiment of windows in a graphical computing environment. The display 202 comprises windows 304-309. The windows 304-309 are organized into layers. A layer represents a window's display priority. For example, windows in higher layers may have a lower display priority than windows in lower layers, so that when windows in the different layers having overlapping display locations, the window with the lower layer (higher display priority) will display in the overlapping locations. Windows having the same layer are not permitted to overlap.

Each window 304-309 has a scissor rectangle, e.g. a bounding rectangle. One or more data structure(s) associated with a window defines a "graphics context", and may comprise content corresponding to display locations extending beyond the scissor rectangle (scrolling windows are one example). Content within the scissor rectangle is displayed, and content outside of the scissor rectangle is clipped (not displayed).

Figure 4:
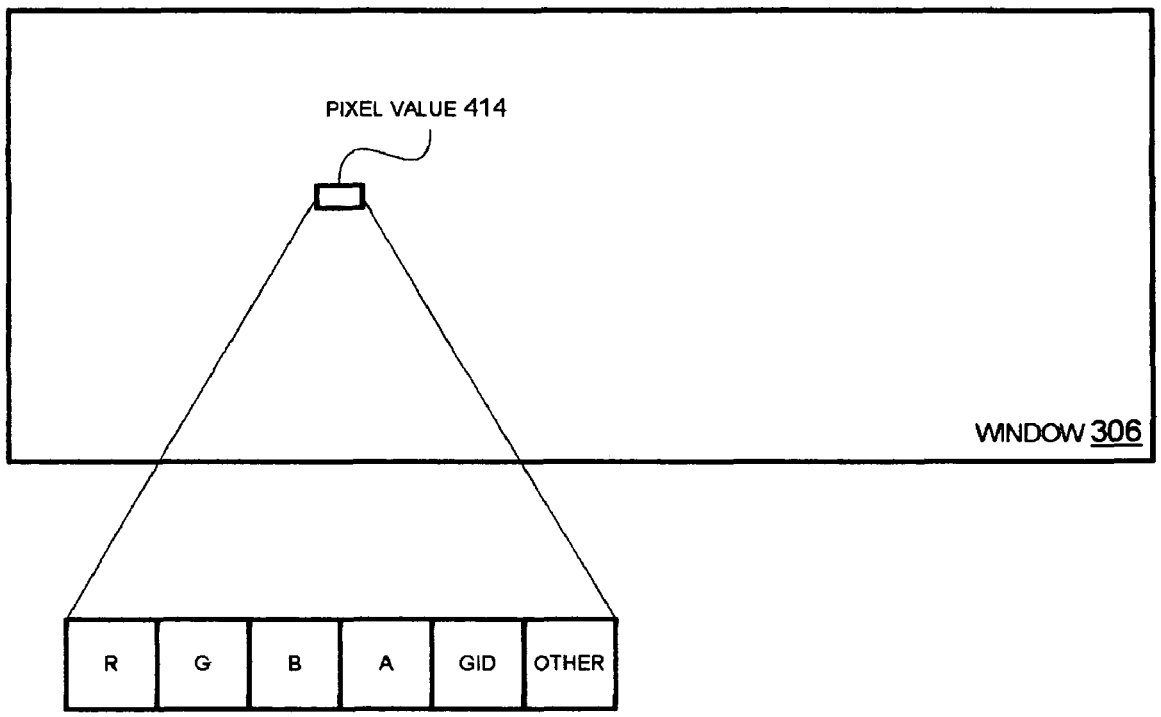
FIG. 4 is a block diagram of an embodiment of a window pixel value.

FIG. 4 is a block diagram of an embodiment of a window pixel value. By way of example, the window 306 comprises a pixel value 414, among others. A pixel value is logic representing display characteristics for a display pixel, e.g. a basic display unit. One format of pixel values is the RGBA format, where bits of the pixel value represent the red, green, blue, and alpha components of the display pixel. The pixel value may also comprise bits (GID) representing the layer of the window comprising the pixel value. The pixel value may comprise other bits as well.

Figure 5:
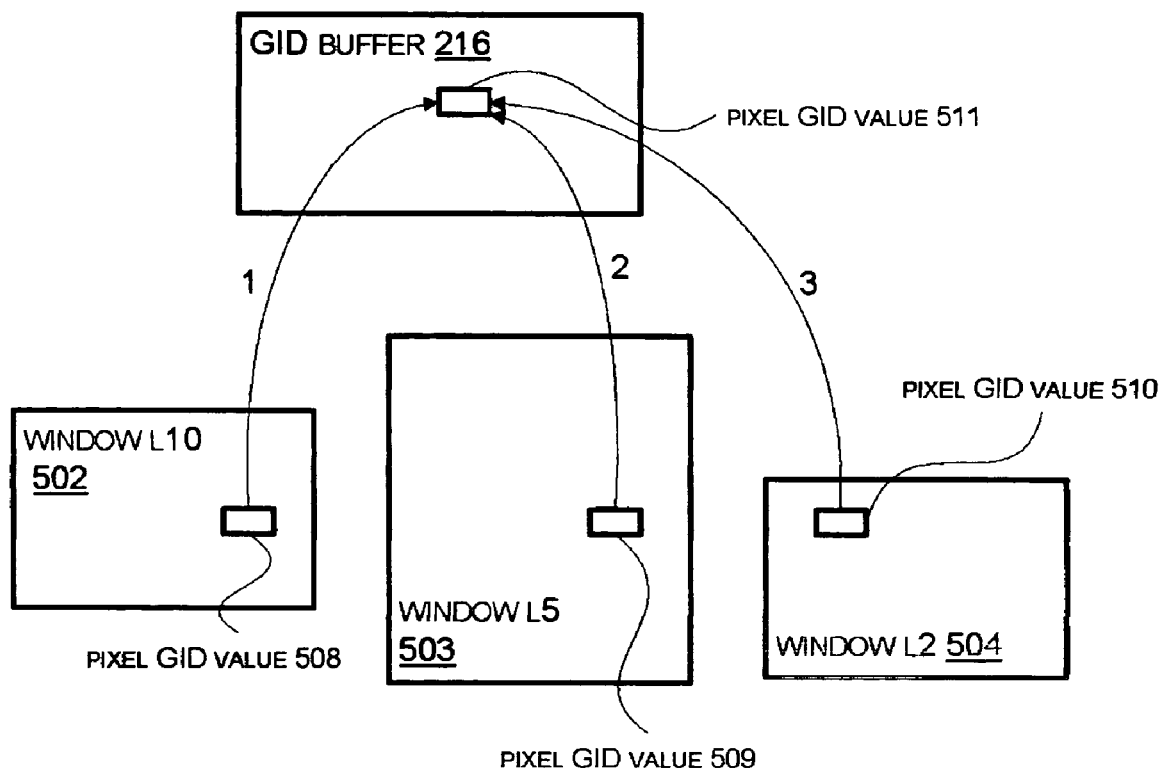
FIG. 5 is a block diagram of an embodiment of a process of determining a display pixel value.

FIG. 5 is a block diagram of an embodiment of a process of determining a display pixel value. The GID buffer 216 comprises a pixel GID value 511 (e.g. the pixel layer id) determined by successively writing corresponding pixel GID values of windows in different layers.

Window I10 502 (a window in layer 10) comprises pixel GID value 508. Window I5 503 (a window in layer 5) comprises a pixel GID value 509. Window I2 504 (a window in layer 2) comprises pixel GID value 510. The pixel GID values 508-510 are corresponding, e.g. they apply to display pixels having identical locations on the display 202. The GID buffer 216 has pixel GID value locations for each display pixel. The pixel GID value 511 corresponds to the pixel GID values 508-510 of the windows. The pixel GID values 508-510 are written successively according to the GID display priority. In an environment where higher GID values (higher layers) have lower display priority, pixel GID value 508 is written first, then overwritten by pixel GID value 509, which is overwritten by pixel GID value 510. Pixel GID value 511 is thus assigned the value of the corresponding window pixel GID value having the highest display priority.

Figure 6:
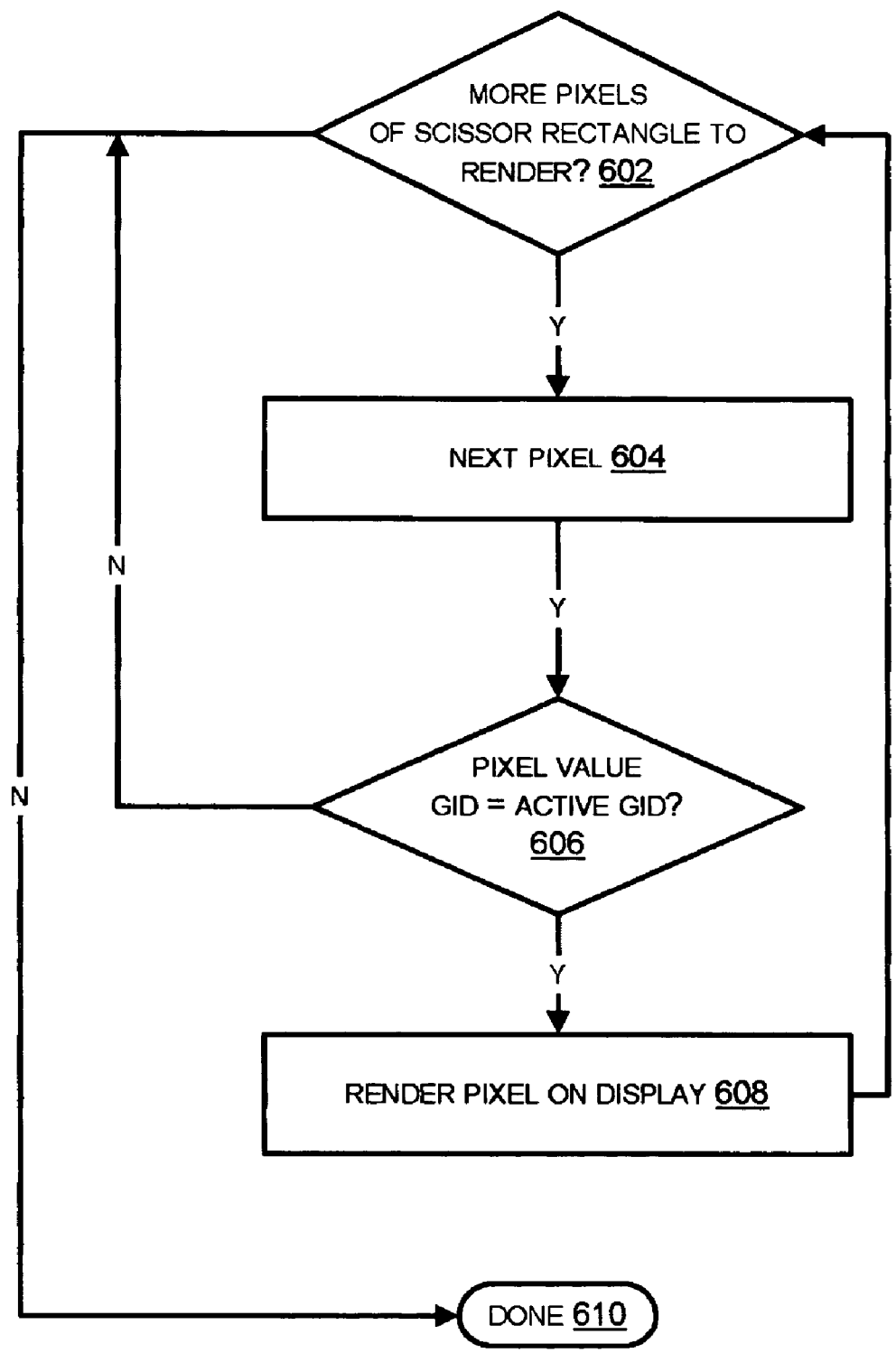
FIG. 6 is a flow chart of an embodiment of a process of rendering window pixels as display pixels.

FIG. 6 is a flow chart of an embodiment of a process of rendering window pixels as display pixels. The content of a window is rendered on the display 202. If at 602 there are more pixels of the region of the contents lying within the scissor rectangle to render, the next pixel to render is identified. If there are not more pixels within the scissor rectangle to process, the process concludes at 610.

A check is made at 606 to determine if the pixel GID value is equal to an active GID value. The active GID value is the GID value (e.g. layer id) of the layer currently processed for display. If at 606 the pixel value is not equal to the active GID value, the process continues at 602. If at 606 the pixel value is equal to the active GID value, the pixel is rendered on the display 608 at 608 and processing returns to 602. Otherwise the process concludes at 610.

Figure 7:
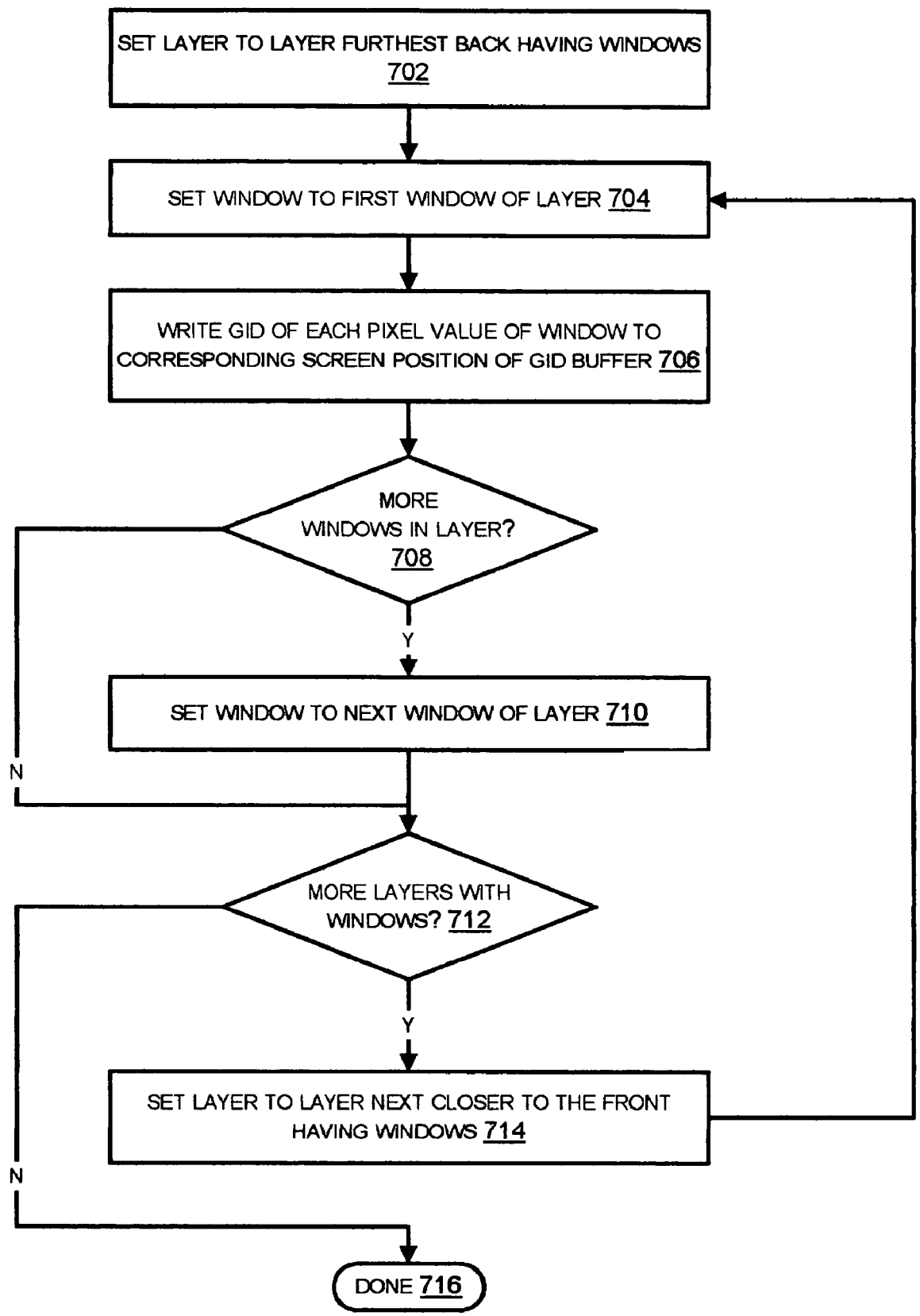
FIG. 7 is a flow chart of an embodiment of a process of rendering window pixels as display pixels.

FIG. 7 is a flow chart of an embodiment of a process of rendering window pixels as display pixels. At 702 the active layer is set to the layer furthest back (e.g. the layer with lowest display priority) having windows. At 704 the active window (e.g. the window to process) is set to a first window of the active layer. At 706 each pixel GID value of the active window is written to corresponding screen positions of the GID buffer 216. If at 708 there are not more windows in the active layer, processing continues at 712. If there are more windows in the active layer, the active window is set to a next window of the active layer at 710.

If at 712 there are not more layers with windows, processing concludes at 716. Otherwise, at 714 the active layer is set to the next furthest back layer having windows (e.g. to the layer with windows having the next-lowest display priority). At 716 the process concludes.

Thus, for each of a plurality of overlapping display windows, the GID buffer 216 is z-buffered with identifications of display layers of the windows.

Figure 8:
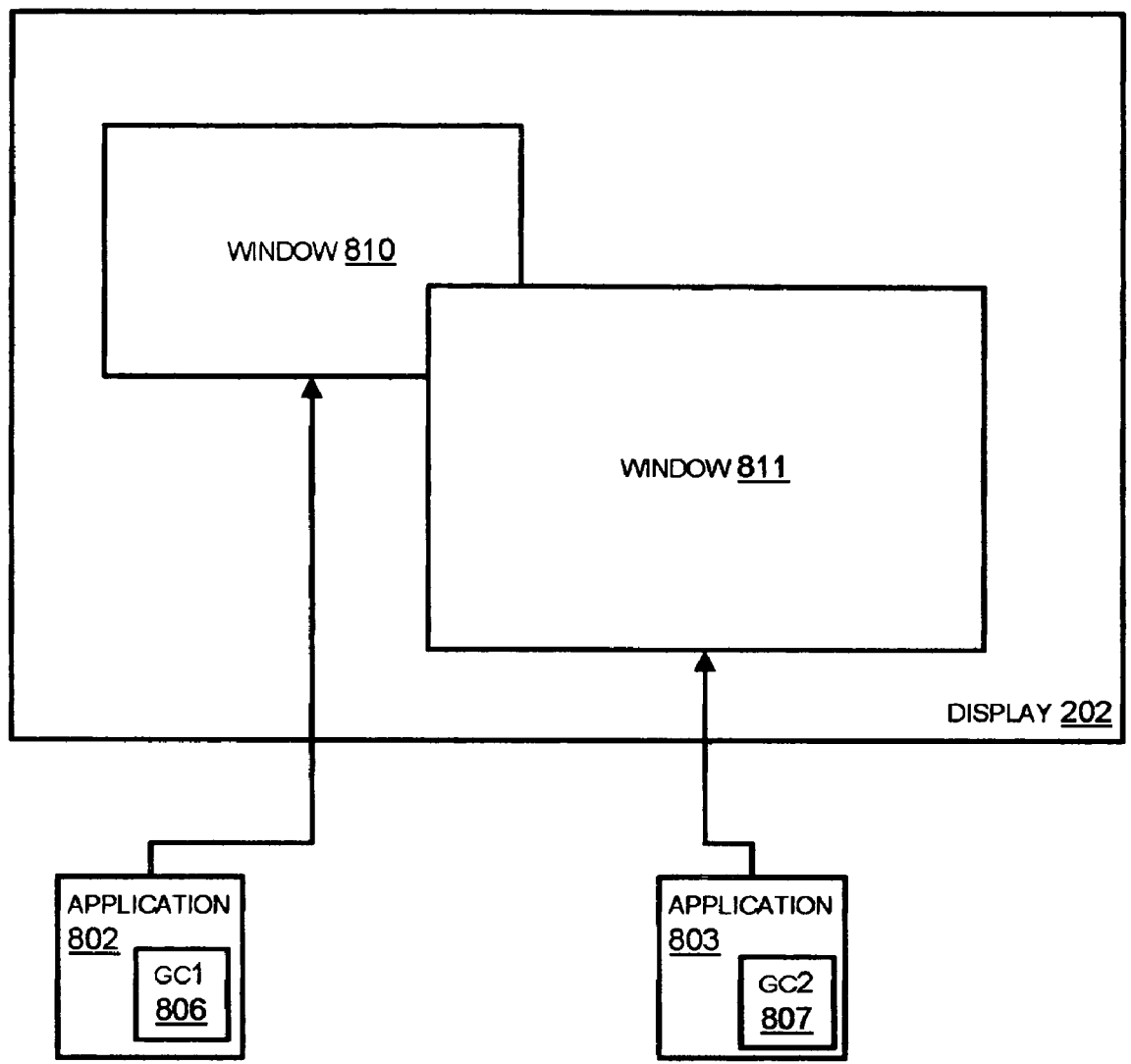
FIG. 8 is a block diagram of an embodiment of a graphical computing environment.

FIG. 8 is a block diagram of an embodiment of a graphical computing environment. The display 202 comprises windows 810 and 811. A first application 802 comprises a first graphics context 806 (e.g. the first application 802 is associated with and controls the content of the first graphics context 806). A second application 803 comprises a second graphics context 807. The first graphics context 806 is associated with window 810, and the second graphics context is associated with window 811. The first application 802 directs display content to the first window 810 by directing the content to the first graphics context 806. The second application 802 directs display content to the second window 811 by directing the content to the second graphics context 807.

In a safety-critical graphical computing environment, it may be advantageous to employ a trusted process to create all windows for the environment. This same or another trusted process may direct the association of processes (e.g. processes of applications) with windows. The windows may be created at the time the operating system 212 is initialized, and then left unchanged in size and position. Thus, once created, windows cannot be resized, moved, or change layers. However, many of these features may be accomplished by employing a trusted process to change the association of windows and processes. In such environments, it may prove simpler to protect the accuracy of the display information, and updating the display may be accomplished faster than in environments where the windows may be moved, sized, and arranged arbitrarily.

A mechanism may be provided in such environments to enable applications to direct their display content to different windows. An application may direct its display content to a different window of the same layer, or to a window of a different layer, by providing a set of fixed associations between the graphics contexts and applications. A set of variable associations is provided between the graphics contexts and the windows. Varying the windows to which graphics information resulting from operation of the applications is directed is accomplished by varying the associations between the graphics contexts and the windows.

Figure 9:
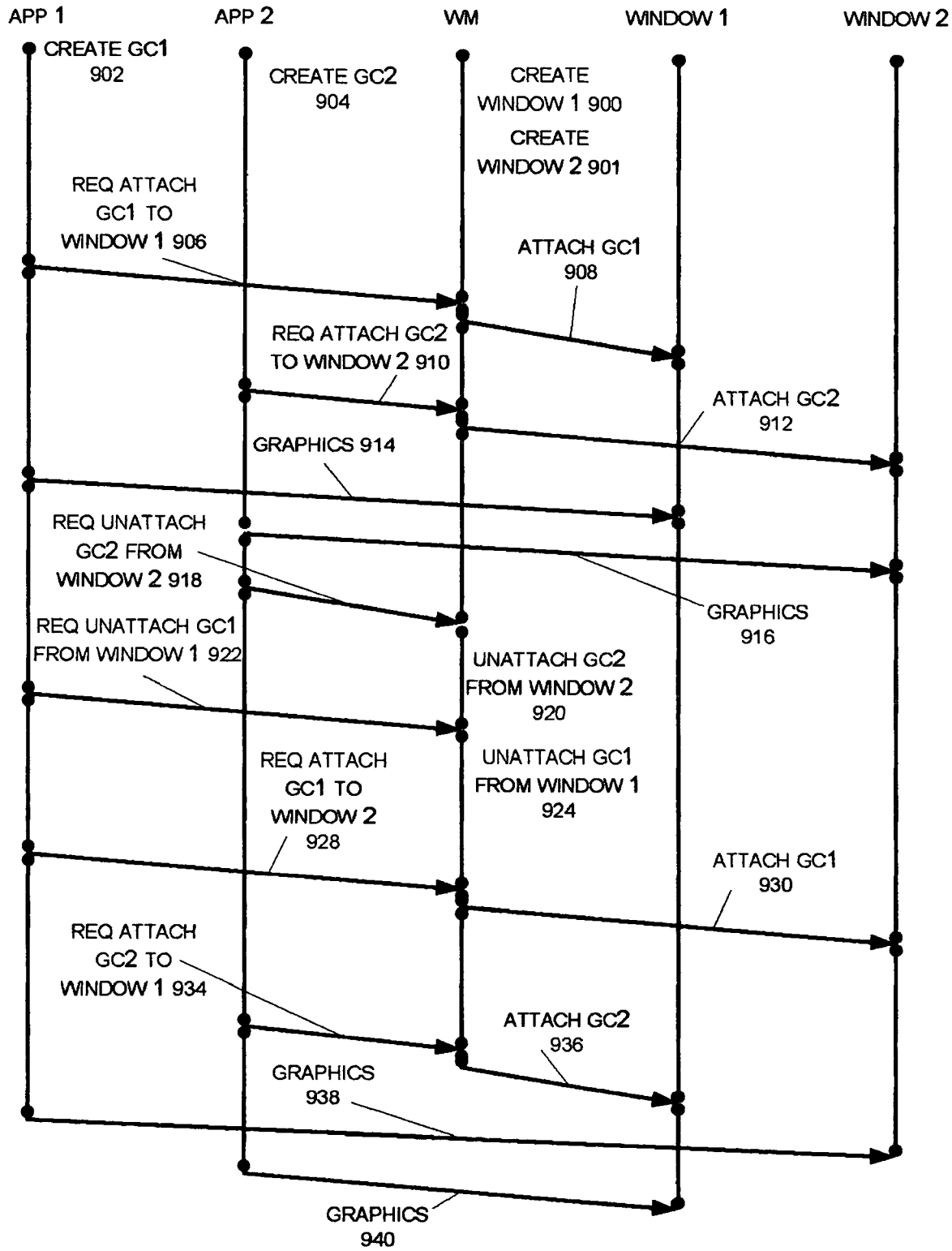
FIG. 9 is an action diagram of an embodiment of a process of associating the contents of windows with applications.

FIG. 9 is an action diagram of an embodiment of a process of associating the contents of windows with applications. FIG. 9 demonstrates how two applications may switch the use of windows, without moving the windows or changing the layers of the windows. At 900 and 901 the window manager logic 214 creates the first window (window 1) and the second window (window 2). The first application (app1) creates the first graphics context (gc1) at 902. The second application (app2) creates the second graphics context (gc2) at 904.

At 906 app1 signals the window manager 214 to request to attach gc1 to window 1, and at 908 the window manager 214 attaches gc1 to window 1. At 910 app2 signals the window manager 214 to request to attach gc2 to window 2, and at 912 the window manager 214 attaches gc2 to window 2.

Display content (graphics information) is sent via gc1 from app1 to window 1 at 914. Display content is sent via gc2 from app2 to window 2 at 916. FIG. 8 represents the state of a graphics environment after act 916.

At 918 app2 requests to unattach gc2 from window 2, and the window manage 214 unattaches gc2 from window 2 at 920. At 922 app1 requests to unattach gc1 from window 1, and the window manager 214 unattaches gc1 from window 1 at 922.

App1 requests to attach gc1 to window 2 at 928. The window manager 214 attaches gc1 to window 2 at 930. App2 and requests to attach gc2 to window 1 at 934. The window manager 214 attaches gc2 to window 2 at 936.

App1 directs display information to GC1, which directs the information to window 2 at 938. App2 directs display information to GC2, which directs the information to window 1 at 940.

Figure 10:
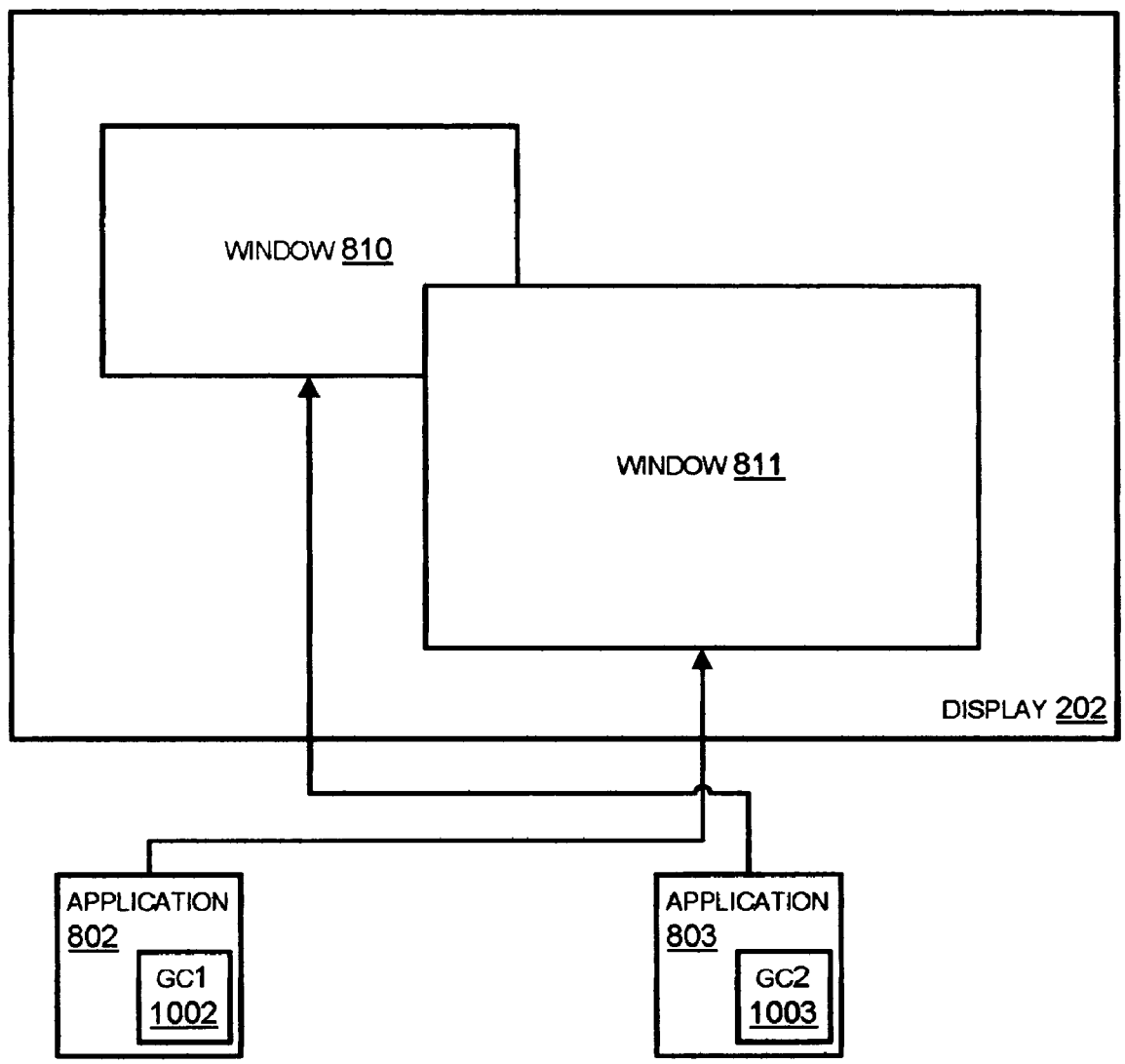
FIG. 10 is a block diagram of an embodiment of a graphical computing environment.

FIG. 10 is a block diagram of an embodiment of a graphical computing environment. FIG. 10 represents the state of the graphics environment of FIG. 8 after act 940. As in FIG. 8, the display 202 comprises windows 810 and 811. The first application 802 now comprises the third graphics context 1002, and the second application 803 now comprises the fourth graphics context 1003. The first application 802 directs display content to the second window 811 by directing the content to the third graphics context 1002. The second application 802 directs display content to the first window 810 by directing the content to the fourth graphics context 1003. The applications have switched windows, without moving the windows or changing the layers of the windows.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method comprising:

associating a first graphic context with a first application;

associating a second graphic context with a second application;

attaching the first graphics context to a first window, the first application performing graphics operations directed to the first graphics context, the graphics operations directed to the first graphics context appearing on the first window as a result of the first graphics context being attached to the first window;

attaching the second graphics context to a second window, the second application performing graphics operations directed to the second graphics context, the graphics operations directed to the second graphics context appearing on the second window as a result of the second graphics context being attached to the second window;

detaching the first graphics context from the first window;

detaching the second graphics context from the second window;

attaching the second graphics context to the first window; and attaching the first graphics context to the second window.

2. The method of claim 1 further comprising:

assigning a first identifier to a first display layer, the first window associated with the first layer;

assigning a second identifier to a second display layer, the second window associated with the second layer;

filling memory locations of a buffer with the first identifier, the memory locations corresponding to a region of the first window; and filling memory locations of the buffer with the second identifier, the memory locations filled with the second identifier corresponding to a region of the second window overlapping the region of the first window.

3. A method comprising:

providing a set of visible windows to which may be directed graphics information resulting from operation of applications;

providing a set of graphics contexts;

providing a set of fixed associations between the graphics contexts and the applications, such that when a first application performs graphics operations directed to a first graphics context, the graphics operations directed to the first graphics context appear on a first window as a result of the first graphics context being attached to the first window, and such that when a second application performs graphics operations directed to a second graphics context, the graphics operations directed to the second graphics context appear on the second window as a result of the second graphics context being attached to the second window; and providing a set of variable associations between the graphics contexts and the windows, whereby varying the windows to which graphics information resulting from operation of the applications is directed is accomplished by varying the associations between the graphics contexts and the windows.

4. The method of claim 3 further comprising:

for each of the set of visible windows, some of the visible windows overlapping others, z-buffering a memory region having locations corresponding to pixels with identifications of display layers of the windows.

5. A device comprising:

machine memory and/or circuits embodying logic operative to provide a set of visible windows to which may be directed graphics information resulting from operation of applications;

provide a set of graphics contexts;

provide a set of fixed associations between the graphics contexts and the applications, such that when a first application performs graphics operations directed to a first graphics context, the graphics operations directed to the first graphics context appear on a first window as a result of the first graphics context being attached to the first window, and such that when a second application performs graphics operations directed to a second graphics context, the graphics operations directed to the second graphics context appear on the second window as a result of the second graphics context being attached to the second window; and provide a set of variable associations between the graphics contexts and the windows, whereby varying the windows to which graphics information resulting from operation of the applications is directed is accomplished by varying the associations between the graphics contexts and the windows.

\* \* \* \* \*